United States Patent [19]

Rogge et al.

[11] Patent Number: 4,771,998
[45] Date of Patent: Sep. 20, 1988

[54] MOBILE BUILDUP APPARATUS FOR TRANSPORTING, SUPPORTING AND PROTECTING SPACE VEHICLE PAYLOADS

[75] Inventors: Donald E. Rogge; John R. Ross, both of Littleton, Colo.

[73] Assignee: Orbital Sciences Corporation II, Fairfax, Va.

[21] Appl. No.: 836,857

[22] Filed: Mar. 6, 1986

[51] Int. Cl.⁴ .............................. B23Q 3/00; B25B 1/00
[52] U.S. Cl. ......................................... 269/17; 29/722; 29/824; 29/407; 89/1.805; 52/749; 414/919
[58] Field of Search ............... 280/411 R, 411 A, 412, 280/413, 415 R, 423 B; 180/140; 29/407, 824, 722, 469; 89/1.805, 36.15, 40.11; 414/919; 52/749; 269/17, 901

[56] References Cited

U.S. PATENT DOCUMENTS

| | | | |
|---|---|---|---|
| 2,391,510 | 12/1945 | Pioch et al. | 269/17 X |
| 2,775,810 | 1/1957 | Galehouse | 269/17 |
| 2,788,145 | 4/1957 | Clark | 280/423 R |
| 2,820,644 | 1/1958 | Smith | 269/17 |
| 3,067,884 | 12/1962 | Williams | 269/17 X |
| 3,142,390 | 7/1964 | Preeman | 414/919 X |
| 3,194,525 | 7/1965 | Webb | 269/17 X |
| 3,339,942 | 9/1967 | Ratkovich | 280/423 A |
| 3,352,072 | 11/1967 | Bole | 52/749 X |
| 3,432,911 | 3/1969 | Rodgers | 29/469 X |
| 3,442,409 | 5/1969 | Larson | 280/415 R |
| 3,490,632 | 1/1970 | McKinney | 414/919 X |
| 3,542,396 | 11/1970 | Hill | 280/411 R |
| 3,546,831 | 12/1970 | Romo et al. | 52/749 X |
| 3,567,252 | 3/1971 | Zubko | 280/415 B |
| 3,703,028 | 11/1972 | Bosquain et al. | 52/749 X |
| 4,003,447 | 1/1977 | Weyer | 180/140 |

Primary Examiner—Charlie T. Moon
Attorney, Agent, or Firm—Kirkland & Ellis

[57] ABSTRACT

A mobile buildup apparatus for transporting, supporting and protecting an upper stage rocket and a mated spacecraft between and in the various facilities through which it must pass prior to their being loaded into the cargo bay of an orbiter of NASA's Space Transportation System and transported into space. The mobile buildup apparatus comprises a transport system, support structure and protective cover. The transport system comprises a pair of semitrailers attached side-by-side removable gooseneck assembly and a removable gooseneck dolly with pintle-hook are attached to the front end of the transport system, and air ride axles to minimize shock and vibration. The support structure comprises an upper stage assembly stand and an access platform both of which are mounted on the mobile buildup apparatus to provide support for and access to, respectively, the upper stage and the mated spacecraft during assembly, testing and ground integration operations. A protective cover also is provided.

2 Claims, 7 Drawing Sheets

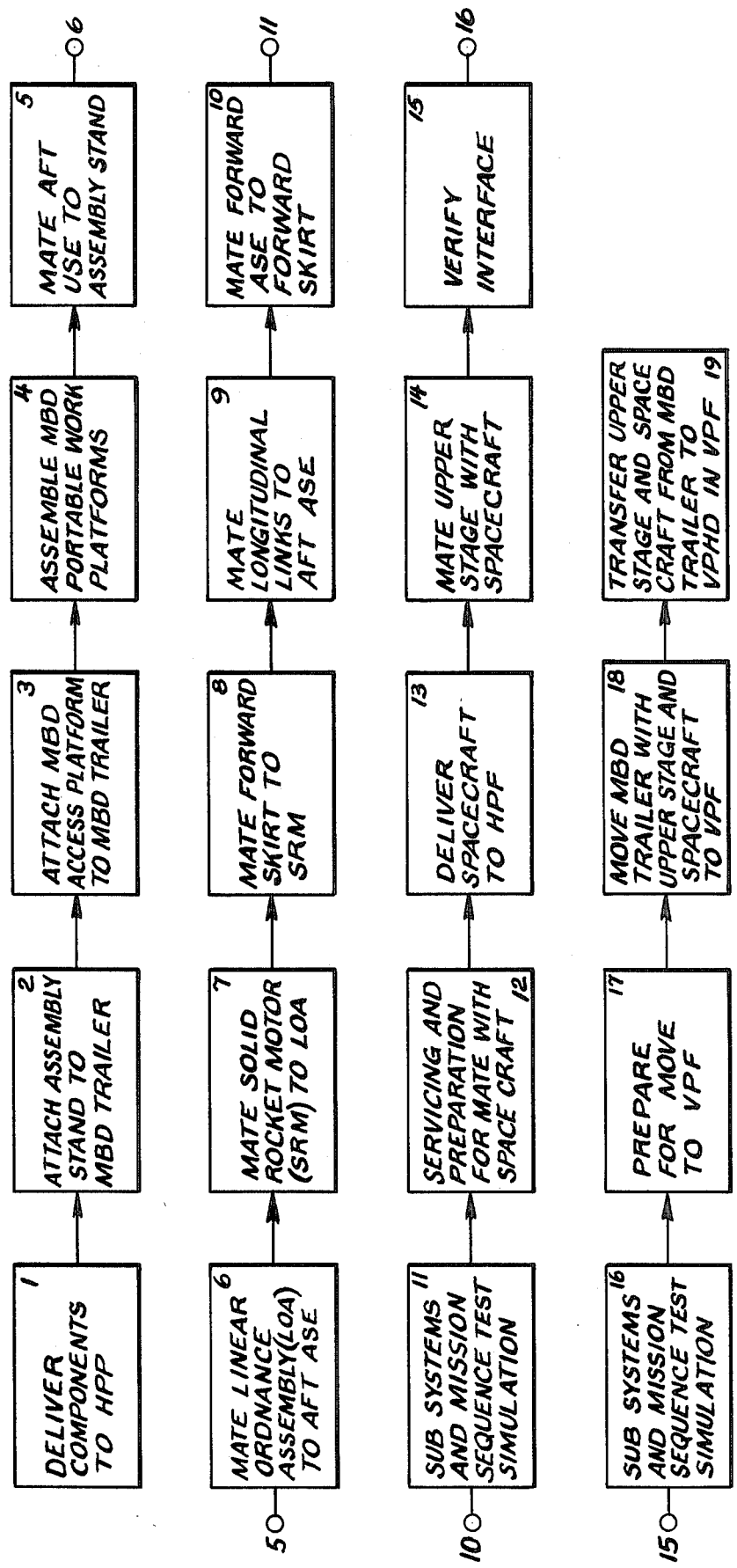

MOBILE BUILDUP APPARATUS FOR TRANSPORTING, SUPPORTING AND PROTECTING SPACE VEHICLE PAYLOADS

BACKGROUND OF THE INVENTION

1. Field of the Invention

The present invention relates to a mobile buildup apparatus for transporting, supporting and protecting an upper stage rocket and a mated spacecraft (collectively referred to as the "space vehicle payload") between and in the various assembly, testing and ground integration facilities through which it must pass prior to payload being loaded into the cargo bay of an orbiter of NASA's Space Transportation System ("STS") and transported into space. The invention supports the buildup, assembly and checkout of the upper stage and its mating with a spacecraft. The invention also provides for the transport of the mated upper stage and spacecraft to a processing facility for testing and integration into the cargo bay of the orbiter.

2. Brief Description of the Prior Art

The STS orbiter orbits the earth at a nominal orbit of 160 nautical miles and provides a platform from which a spacecraft can be launched into either geostationary orbit (22,300 nautical miles) or planetary orbit by means of an upper stage rocket mated to the spacecraft. Before being inserted into the cargo bay of the orbiter, however, the space vehicle payload must be assembled, inspected, tested, serviced, mated, retested off-line and then transported to the Vertical Processing Facility ("VPF") at Kennedy Space Center ("KSC") where it undergoes cargo integration and testing that simulates all payload interfaces with the orbiter. Since the space vehicle payload includes explosives and other potentially hazardous materials, this work is conducted in a Hazardous Processing Facility ("HPF") at the Spacecraft Assembly and Encapsulation Facility ("SAEF-2") a Kennedy Space Center. After processing at the Hazardous Processing Facility is completed, the space vehicle payload is transported to the Vertical Payload Facility for installation in the Vertical Payload Handling Device which is used to simulate the orbiter cargo bay for integrated testing.

In previous launches, the processing of space vehicle payloads at the Hazardous Processing Facility was conducted by means of support structures and scaffolding that were erected on the floor each time a space vehicle payload was being processed. Once the spacecraft and upper stage were mated, the payload was hoisted from the support structure and scaffolding and then loaded on and secured to a transport vehicle for the trip to the Vertical Payload Facility. The support structure and scaffolding were subsequently removed from the Hazardous Processing Facility in order to accommodate other missions.

In the past, the typical space vehicle payload weighed about 7,000 pounds and took up only a quarter of the orbiter's cargo bay. The relatively light weight and small size of the space vehicle payload simplified handling and assembly. Moreover, in the past there has been a substantial time (e.g., several months) between launches of the orbiter. Thus, competition for use of the Hazardous Processing Facility has been minimal, and there has been adequate time for the assembly and disassembly of support structure and scaffolding for space vehicle each payload.

Present plans for use of the orbiter differ substantially from the previous pattern of use. For example, it is anticipated that the orbiter will carry much heavier and larger space vehicle payloads. In addition, there will be a shorter time between launches in order to permit the STS to make more frequent flights and to compete more effectively with alternative launch vehicles, such as the Ariane Expendable Launch Vehicle of the European Space Agency, for the launch of commercial payloads.

If the weight of the space vehicle payload attached to a single upper stage is increased from 7,000 pounds to 43,000 pounds, the task of assembly and disassembly of the necessary support and scaffolding becomes more difficult and time consuming. In addition, if the time between launches is reduced from months to days, the prior art system becomes less economical and efficient.

It is therefore an object of the present invention to provide an easily transportable, multifacility compatible apparatus from which all assembly, testing and ground integration operations can be performed, thereby eliminating the need for dedicated hardware in a specific facility for each space vehicle payload.

It is also an object of this invention to transport this apparatus between and in the various assembly, testing and ground integration facilities in an environmentally controlled and contamination controlled environment.

SUMMARY OF THE INVENTION

The present invention provides a new and improved mobile buildup apparatus for transporting, supporting and protecting space vehicle payloads between and in the various assembly testing and ground integration facilities through which it must pass prior to being loaded into the cargo bay of an STS orbiter and transported into space.

The preferred embodiment of the mobile buildup apparatus of the present invention comprises a transport system; a support structure and a protective cover. The transport system, which has a rated load capacity of about 80,000 pounds, comprises two standard semitrailers of the type pulled by tractors of off-the-road variety. The trailers are attached to a beam between the cargo decks of the two trailers in a side by side configuration. The width of the beam is selected to provide the desired total width of the two cargo decks of the trailers and the beam. A removable gooseneck and a removable gooseneck dolly with pintle-hook are attached at the front end of the pair of trailers. The axles of the trailers and the gooseneck dolly are air ride axles to minimize shock and vibration during transport. This transport system is capable of moving space vehicle payloads within a facility or between facilities. In addition, an air bearing transfer system consisting of air bearing pallets and controls can be used to transfer loads between the mobile buildup apparatus and the floor or other nearby surface.

The support structure comprises an upper stage assembly stand and access platform. The upper stage assembly stand provides support for both the upper stage, which is mounted on the top surface of the transport system and for the spacecraft which is mated to the upper stage. Support is thus provided during assembly and testing operations and during transport either within a facility or between facilities. The upper stage assembly stand is welded into subassemblies that are bolted together in a manner that provides for rapid assembly and disassembly.

The access platform also is mounted on the top surface of the transport system. It surrounds the upper stage assembly stand and provides access to the upper stage and the spacecraft during assembly and test operations. In the preferred embodiment, the access platform is bolted to the cargo decks of the transport system and is equipped with guardrails and toeboards.

Finally, the protective cover protects the space vehicle payload against weather and contamination while being transported between and within assembly, testing and ground integration facilities. A portable work platform that rests on the floor around the mobile buildup apparatus and surrounds the assembly stand is used to install the protective cover. A lifting sling attached to the upper stage assembly stand can be used to lift the assembly stand portion of the mobile buildup apparatus by means of an overhead crane located in the Hazardous Processing Facility. A payload lifting fixture is used with the overhead crane to lift the space vehicle payload from the upper stage assembly stand of the mobile buildup apparatus and position it in a check-out cell in the Vertical Processing Facility for certain assembly and test operations. The payload lifting fixture interfaces with the space vehicle payload by means of an upper stage handling kit containing suitable adapters, slings, taglines, brackets and associated hardware.

When built and tested on the mobile buildup apparatus of the present invention, space vehicle payloads are easily transported, supported and protected. For example, the components of the upper stage, including the forward and aft airborne support equipment, linear ordnance assembly connection, solid rocket motor forward skirt, and longitudinal links are sequentially mated in the assembly stand while the mobile buildup apparatus is located in the Hazardous Processing Facility. A subsystems and simulated mission sequence test is performed on the upper stage in order to check redundant systems and to evaluate test data. The upper stage is then serviced and prepared for mating with the spacecraft. Following mating, the mechanical and electrical interfaces are checked. A subsystems and simulated mission sequence test is again performed and the space vehicle payload is then protected and transported by the mobile buildup apparatus of the present invention to the Vertical Processing Facility. Thus, all steps necessary for assembling, testing and integrating space vehicle payloads can be carried out on the mobile buildup apparatus of the present invention.

DESCRIPTION OF THE DRAWINGS

FIG. 8 is a block diagram of steps in the assembly, testing and ground integration of the space vehicle payload for which the mobile buildup apparatus is utilized.

DESCRIPTION OF THE PREFERRED EMBODIMENT

The preferred embodiment of the mobile buildup apparatus is set forth herein, for illustrative purposes, in connection with the assembly of a space vehicle payload consisting of an upper stage such as the Transfer Orbital Stage TM (TOS ®) upper stage and a mated spacecraft (e.g., a satellite).

Figure 1:
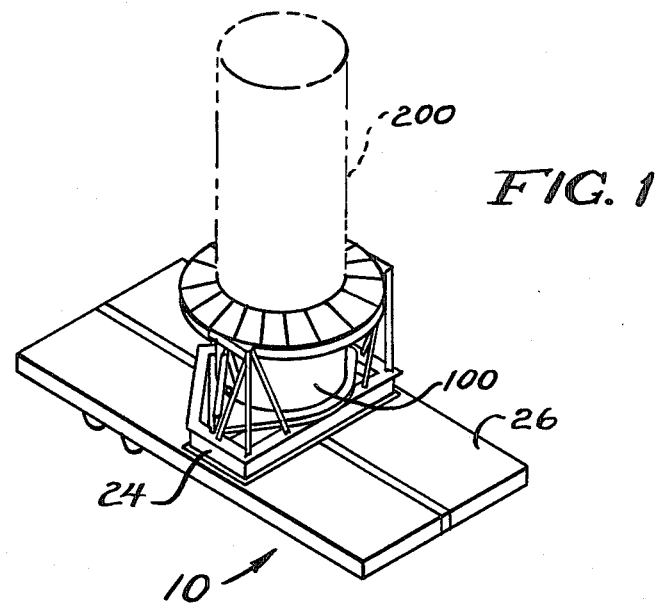
FIG. 1 is a perspective angle view of a space vehicle payload mounted on the upper stage assembly stand of the mobile buildup apparatus.

FIG. 1 illustrates an upper stage 100 of the type for which the mobile buildup apparatus 10 is adapted. Upper stage 200 includes a solid rocket motor 102 to which a forward skirt 104 is attached. The solid rocket motor 102 and forward skirt 104 are connected to an aft airborne support equipment cradle 106 by means of a metal to metal explosive connection 108 of a type such as a linear ordnance assembly. The aft cradle 106 is described in a copending application entitled "Cradle Apparatus for Supporting Payloads in a Space Vehicle," filed Oct. 10, 1985, Ser. No. 786,212, by Frank Lawrence Byers and assigned to the assignee of the present invention.

The solid rocket motor 102 and forward skirt 104 are connected to a forward airborne support equipment cradle 110 by means of a bearing pad connection between the solid rocket motor 102 provided by a plurality of pads 112 on the forward airborne support equipment cradle 110. The pads are described in a copending application entitled "Pad Apparatus for Supporting Payload in a Cradle Apparatus of a Space Vehicle," filed Oct. 10, 1985, Ser. No. 786,209, by Frank Lawrence Byers and assigned to the assignee of the present invention. A spacecraft, such as a satellite (not shown), is attached to the front edge 114 of the forward skirt 104. Longitudinal links 116 transfer longitudinal loads from the forward ASE cradle 110 to the aft ASE cradle 106. Those loads are in turn transferred to the body of the orbiter by means of trunnion connections 118 and keel connections 120.

Figure 2:
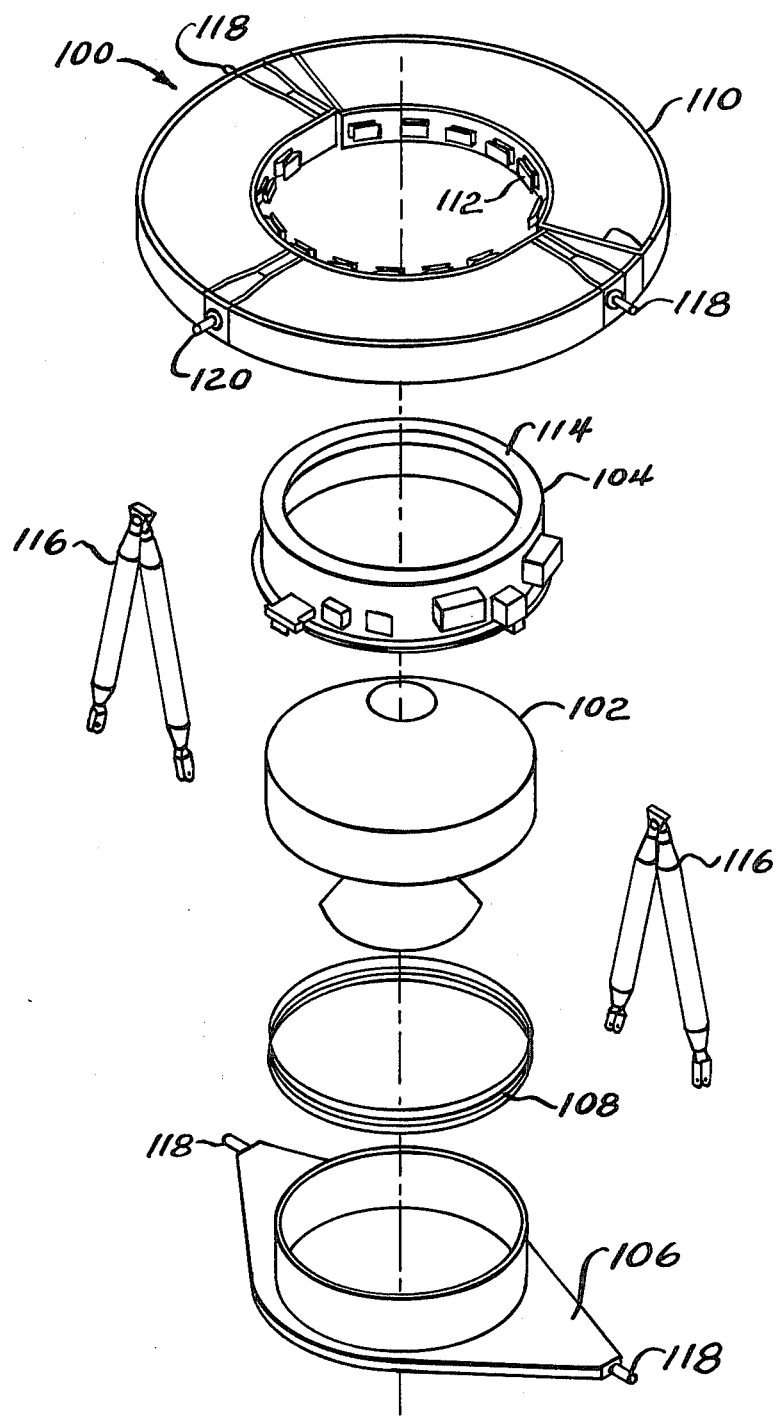
FIG. 2 is an exploded perspective angle view of an upper stage and related support equipment of a type for which the mobile buildup apparatus can be used.

The mobile buildup apparatus 10 of the present invention is shown in FIG. 2. The space vehicle payload, which consists of upper stage 100 mated with a spacecraft 200, is assembled and tested on an upper stage assembly stand 24, which is mounted on a transport system 26. Upper stage assembly stand 24 provides support for the upper stage 100 and for the spacecraft 200 during assembly, test, transport and integration operations. Assembly stand 24 is welded into subassemblies (not shown), which are bolted together to provide for rapid assembly and disassembly.

Figure 3:
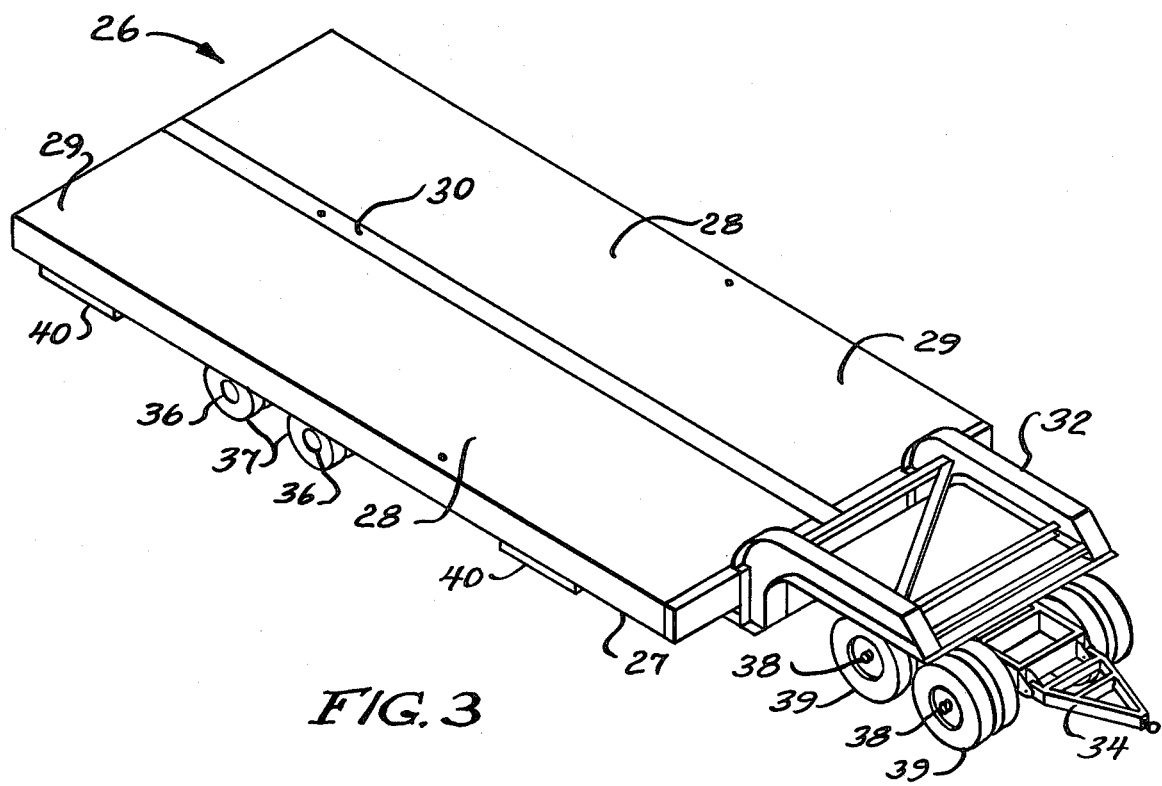
FIG. 3 is a perspective angle view of the transport system of the mobile buildup apparatus.

As shown in FIG. 3, in the preferred embodiment, transport system 26 consists of two standard, commercially available semitrailers 28, which are attached along their longitudinal axes to a center beam 30. The width of center beam 30 is selected to provide the desired width of transport system 26, and in the preferred embodiment, the top surface of center beam 30 provides a portion of the upper surface or cargo deck 29 of transport system 26. A removable gooseneck 32 is attached to the front end of each trailer 28, and a dolly 34 is attached to gooseneck 32 to hold the front of transport system 26 off the floor or road surface. To minimize shock and vibration, loads are carried by means of air ride axles 36 on trailer wheels 37 and by means of air ride axles 38 on dolly wheels 39. Air bearings 40 of a suitable type are carried by undersides 27 of trailers 28 and can be inflated and used to transfer the loads from wheels 37 and 39 to the floor or road surface.

Figure 4:
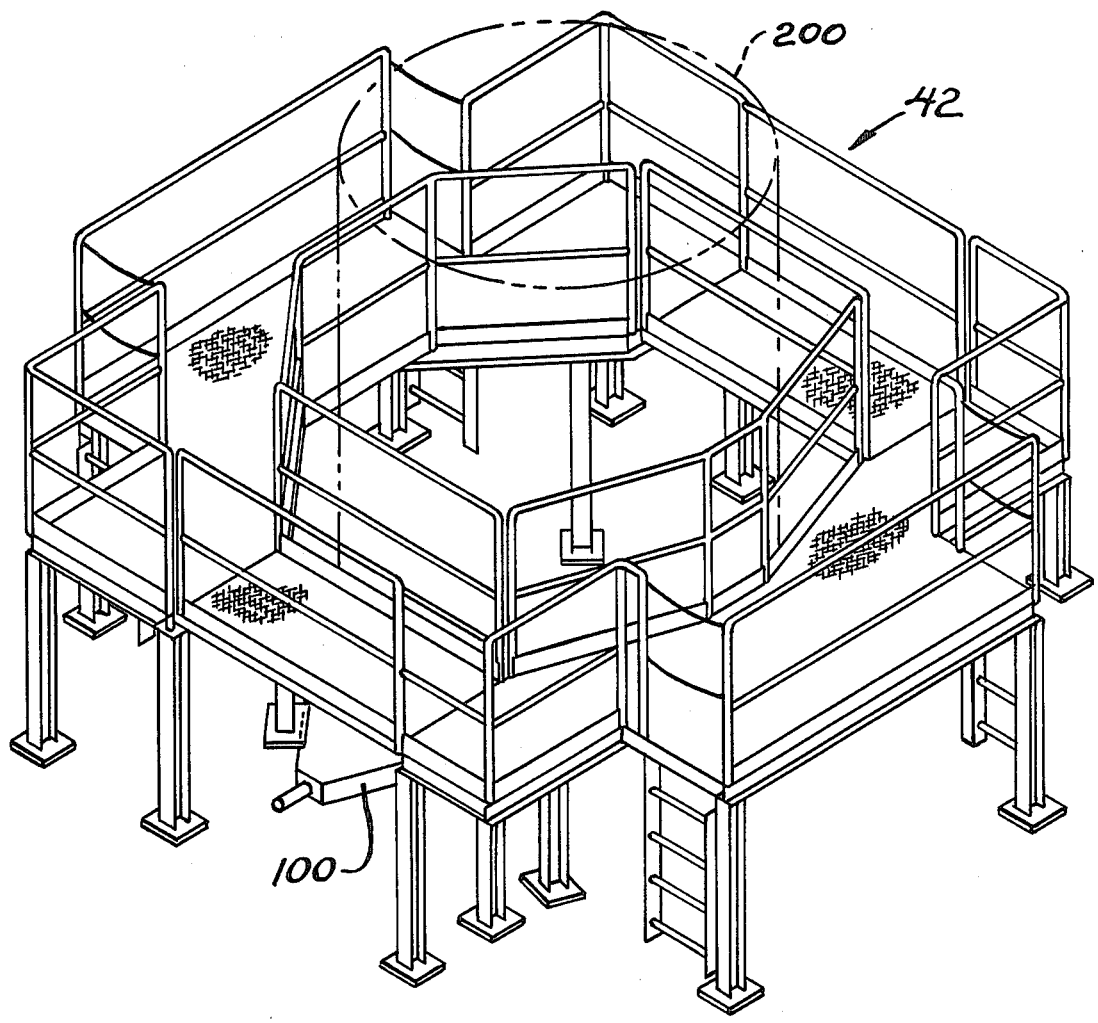
FIG. 4 is a perspective angle view of the access platform of the mobile buildup apparatus.
Figure 4A:
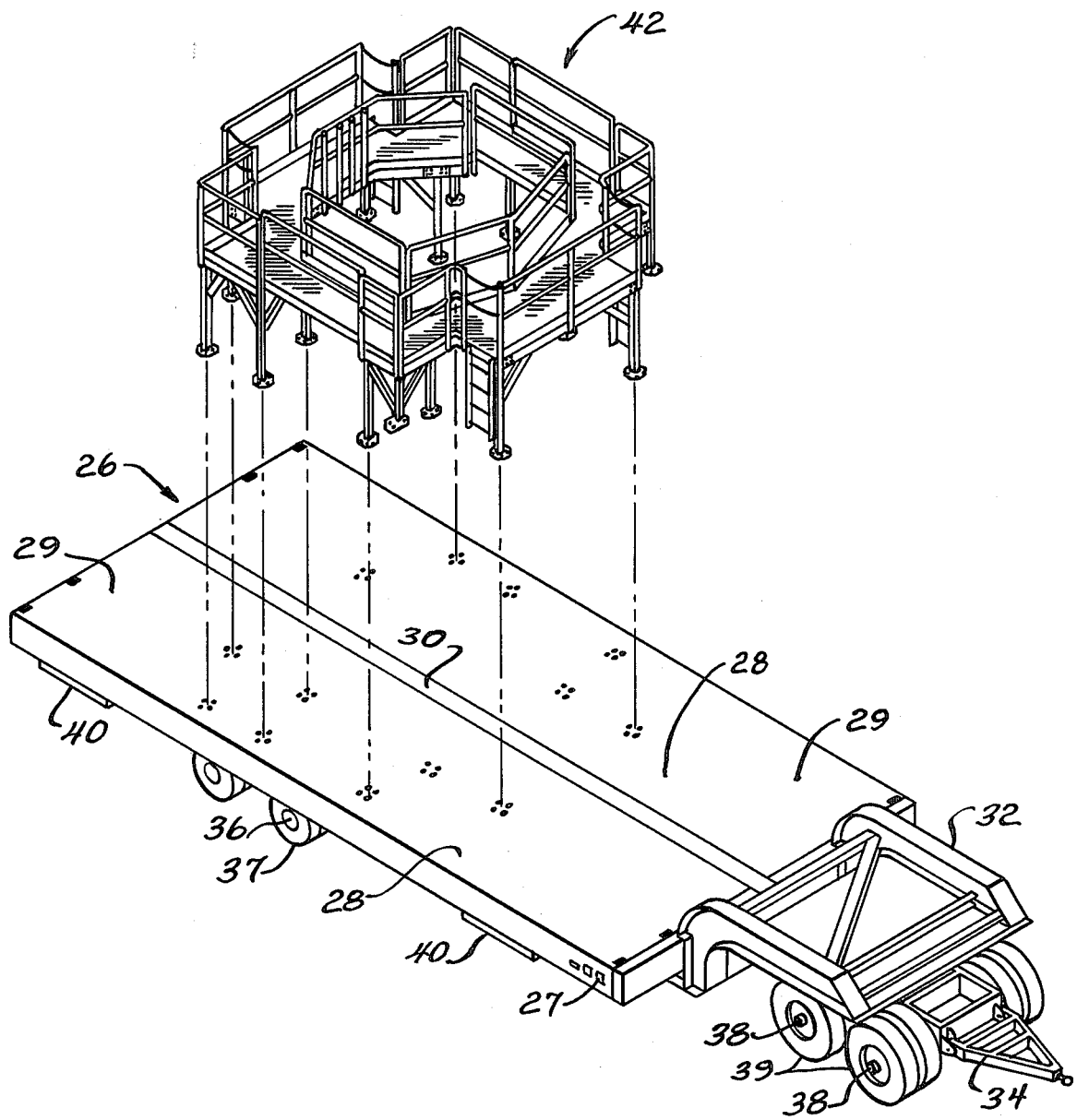
FIG. 4a is a perspective angle view of the trailer pair and the access platform of the mobile buildup apparatus.

An access platform 42, as shown in FIG. 4, is also attached to the upper surface of cargo deck 29 (see FIG. 3) of transport system 26 (not shown in FIG. 4). Access platform 42 surrounds assembly stand 24 and provides access for personnel working on upper stage 100 and spacecraft 200 during assembly, mating and testing. FIG. 4a more clearly illustrates the attachment of access platform 42 to the upper surface of cargo deck 29 of trailer pair 26.

Figure 5:
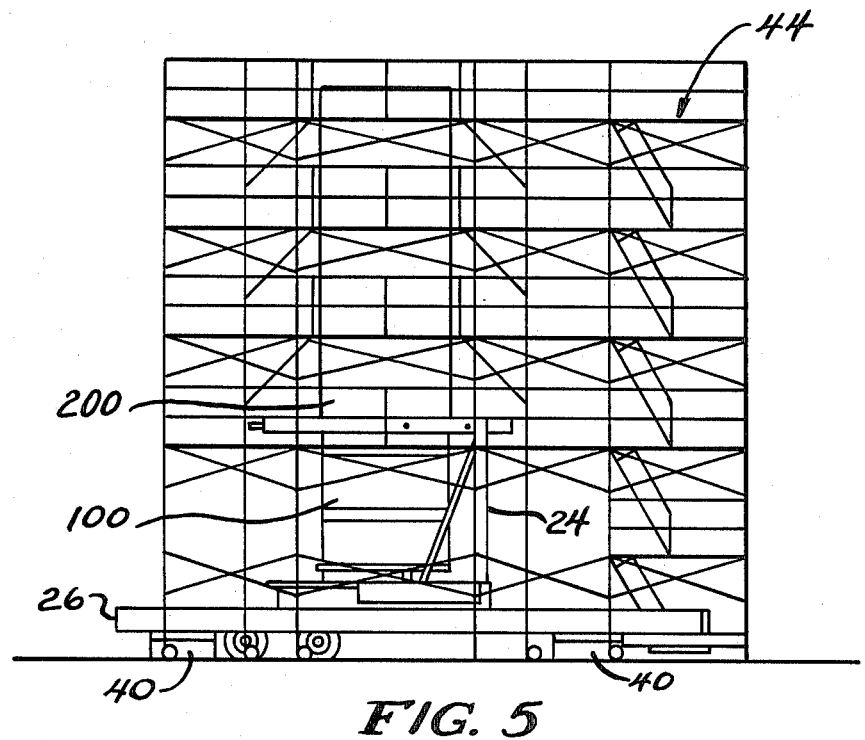
FIG. 5 is a side view of the portable work platform of the mobile buildup apparatus.
Figure 6A:
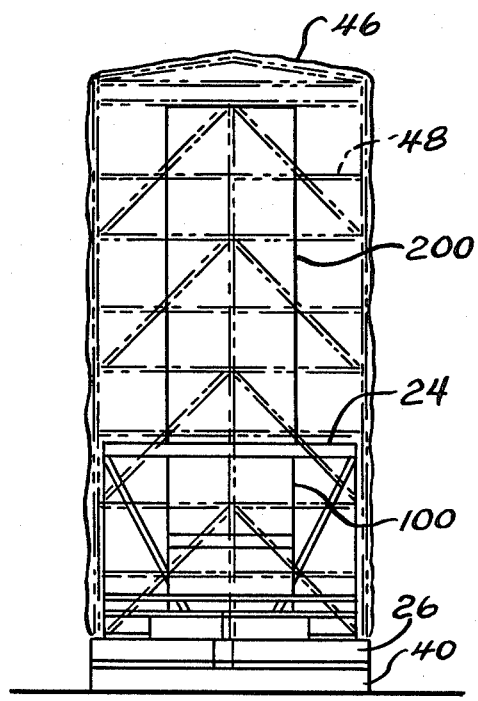
FIG. 6a is a rear view of the protective cover of the mobile buildup apparatus.
Figure 6B:
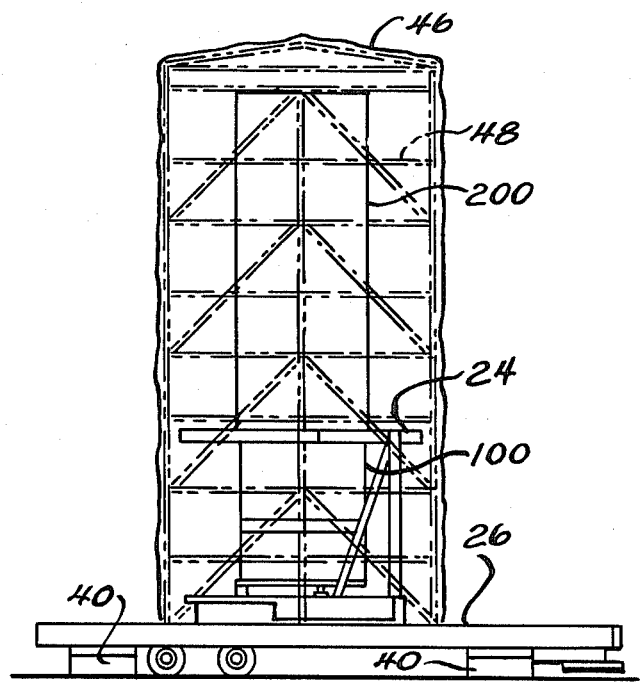
FIG. 6b is a side view of the mobile buildup apparatus protective cover.
Figure 6C:
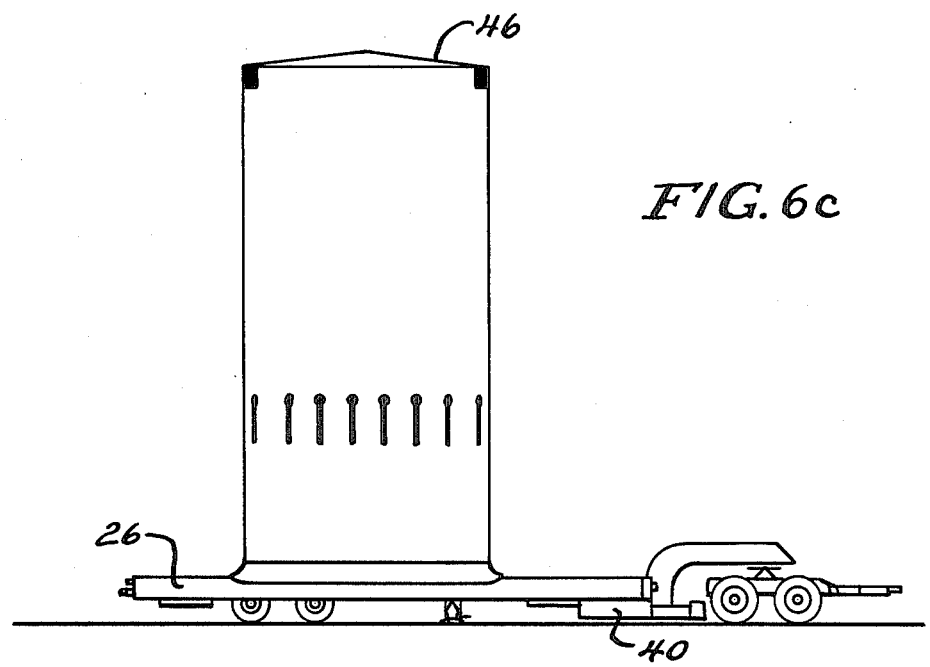
FIG. 6c is an additional side view of the protective cover of the mobile buildup apparatus.

As shown in FIG. 5, portable work platforms 44 are positioned on the floor around mobile buildup apparatus 10. Portable work platforms 44, which can be of a standard commercial design, are used to provide access to upper stage 100 and spacecraft 200 by personnel for installation of a protective cover 46 and its support structure 48. Cover 46 protects upper stage 100 and spacecraft 200 against weather and contamination during transport or storage on mobile buildup apparatus 10 (see FIGS. 6a, b and c. Support structure 48 is mounted on transport system 26 and is used to support cover 46 and to prevent cover 46 from contacting upper stage 100 or spacecraft 200.

Figures 7A, 7B:
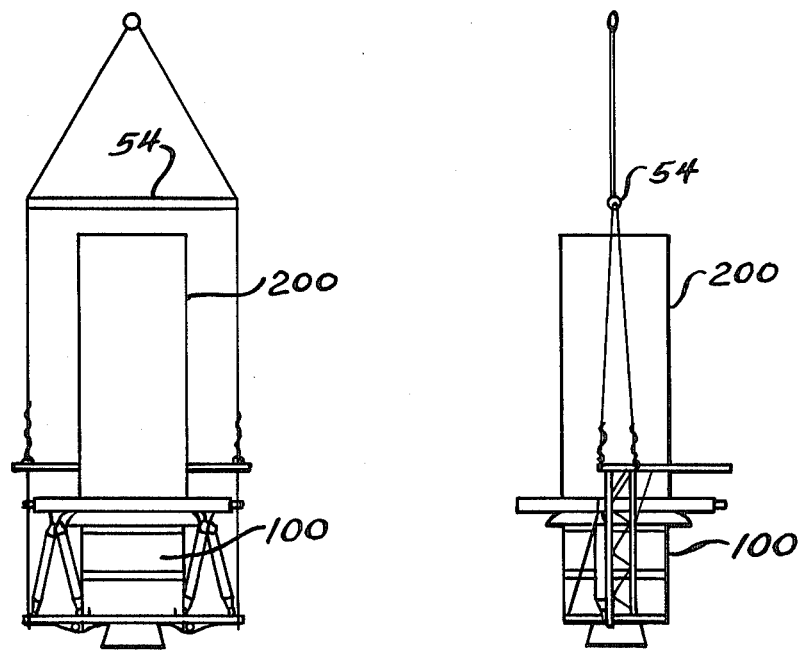
FIG. 7a is a front view of the payload lifting fixture lifting an upper stage and mated spacecraft.
FIG. 7b is a side view of the payload lifting fixture lifting an upper stage and a mated spacecraft.

As shown in FIG. 7, a payload lifting fixture 54 is used with an overhead crane (not shown) in the Vertical Payload Facility to lift the upper stage 100 and spacecraft 200 between mobile buildup apparatus 10 and a checkout cell (not shown). Fixture 54 is configured to attach to upper stage 100 and spacecraft 200 at the same support points by which they are supported in the checkout cell (not shown) of the Vertical Payload Facility (not shown), in the Payload Ground Handling Mechanism (not shown) and in the cargo bay (not shown) of the orbiter (not shown). Fixture 54 interfaces with the space vehicle payload by means of an upper stage handling kit (not shown) containing suitable adapters, slings, taglines, brackets and associated hardware (not shown).

Assembly, testing and integration steps performed on upper stage 100 and spacecraft 200 in conjunction with mobile buildup apparatus 10 of the present invention are illustrated in FIG. 8. Upper stage assembly stand 24 is first attached to cargo decks 29 of transport system 26 in the Hazardous Processing Facility. Forward and aft airborne support equipment cradles 110 and 106, linear ordinance assembly 108, solid rocket motor forward skirt 104 shown in FIG. 2, are sequentially mated. A subsystems and simulated mission sequence test is performed to ensure the functioning of redundant systems and to evaluate data outputs. Upper stage 100 is then serviced and prepared for mating with spacecraft 200. After mating, the mechanical and electrical interfaces (not shown) between upper stage 100 and spacecraft 200 are checked.

Following other necessary preparation, upper stage 100 and mated spacecraft 200 are moved on mobile buildup apparatus 10 from the Hazardous Processing Facility to the Vertical Processing Facility where upper stage 100 and mated spacecraft 200 are transferred from mobile buildup apparatus 10 to the Vertical Payload Handling Device (not shown) in the Vertical Processing Facility for integration into the cargo bay (not shown) of the orbitor.

While the preferred embodiment of the invention has been illustrated and described, it is to be understood that the invention is not limited to the precise construction therein disclosed and the right is reserved to all changes and modifications coming within the scope of the invention as defined in the appended claims.

What is claimed is:

1. An apparatus for transporting, supporting and protecting space vehicle payloads during assembly, testing and ground integration operations, said apparatus comprising:

transport means having a horizontal planar top surface mounted on wheels for moving said payload between and in the various facilities through which it must pass prior to being loaded into the cargo bay of an orbiter and transported into space;

assembly stand means mounted on the top surface of said transport means, said assembly stand means being configured to support the space vehicle payload;

access platform means elevated above said top surface of said transport means for providing a horizontal support surface in close proximity to and surrounding said assembly stand means, said access platform means mounted on the top surface of said transport means, so that access also is provided to any space vehicle payload being supported by said assembly stand means; and protective cover means for substantially covering said space vehicle payload during transport so that said space vehicle payload is protected against contamination and weather.

2. The apparatus as claimed in claim 1 wherein said transport means further comprises:

air bearing means attached to the underside of said transport means for lifting and moving said load from said wheels to the floor or road surface.

* * * * *